(12) United States Patent
Sakamoto et al.

(10) Patent No.: US 6,428,104 B1
(45) Date of Patent: Aug. 6, 2002

(54) BACKLASH REDUCING STRUCTURE FOR RECLINER ADJUSTER

(75) Inventors: Yutaka Sakamoto; Hiroki Honda, both of Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/589,206

(22) Filed: Jun. 8, 2000

(30) Foreign Application Priority Data

Jun. 8, 1999 (JP) .......................................... 11-160886

(51) Int. Cl.[7] ................................................ B60N 2/02
(52) U.S. Cl. .............................. 297/362.11; 297/362.14
(58) Field of Search ........................... 297/362.11, 362, 297/365, 376, 362.14, 364, 362.12, 375, 367; 74/458

(56) References Cited

U.S. PATENT DOCUMENTS 3,469,469 A 9/1969 Burger
4,528,862 A 7/1985 Goldowsky
4,685,735 A * 8/1987 McFalls et al. ..... 297/362.14 X
4,979,404 A 12/1990 Nakata et al.
5,295,730 A * 3/1994 Rees .................. 297/362.14 X
5,997,089 A * 12/1999 Kawasaki ............... 297/362.14

FOREIGN PATENT DOCUMENTS

| GB | 2 117 484 | 10/1983 |
| JP | 42-7950 | 4/1942 |
| JP | 10-217817 | 8/1998 |

* cited by examiner

Primary Examiner—Peter M. Cuomo
Assistant Examiner—Rodney B. White
(74) Attorney, Agent, or Firm—Wenderoth, Lind & Ponack, L.L.P.

(57) ABSTRACT

An automobile seat or recliner has a recliner adjuster for adjusting the inclination of a seat back relative to a seat cushion. The recliner adjuster is provided with a backlash reducing structure that includes a worm gear attached rotatably to the seat cushion, a sector gear fixed to the seat back and held in engagement with the worm gear, and a pressing member for pressing the sector gear to the worm gear to reduce backlash therebetween.

2 Claims, 5 Drawing Sheets

BACKLASH REDUCING STRUCTURE FOR RECLINER ADJUSTER

BACKGROUND OF THE INVENTION

1. Field of the Invention

The present invention relates generally to a recliner adjuster attached to, for example, an automobile seat for appropriately adjusting the inclination of a seat back with respect to a seat cushion and, in particular but not exclusively, to a backlash reducing structure for a recliner adjuster.

2. Description of the Related Art

In the recliner adjuster disclosed in Japanese Utility Model Publication (examined) No. 42-7950, a sector gear is fixed to a seat back while a worm gear, which can be freely engaged with and disengaged from the sector gear, is attached rotatably to a seat cushion. The worm gear is connected to an operation shaft and, by pulling the operation shaft in the axial direction thereof and by subsequently lifting it up, the engagement between the worm gear and sector gear is released. When a load is applied to the seat back in this state, the seat back tilts and the inclination thereof can be altered quickly. When the hand is released from the operation shaft, the worm gear and sector gear reengage to hold the seat back in that position. In addition, if fine adjustment of the inclination of the seat back is required, when the operation shaft is rotated to rotate the worm gear, the sector gear held in engagement with the worm gear rotates gradually whereby the seat back can be altered smoothly to the desired inclination.

Recently, as disclosed in Japanese Laid-Open Patent Publication (unexamined) No. 10-217817, a recliner adjuster was proposed in which a sector gear and a worm gear having a lead angle greater than the friction angle are respectively attached to a seat back and a seat cushion, and in which by tilting the seat back, the worm gear is caused to rotate by way of the sector gear whereby the inclination of the seat back is altered as appropriate.

However, there are problems in a recliner adjuster having a sector gear and a worm gear which engage with each other in that abnormal noise is generated by the backlash which represents the play between the teeth surfaces of the sector gear and worm gear, and in that the stability of the seat back and seating comfort are deteriorated.

SUMMARY OF THE INVENTION

The present invention has been developed to overcome the above-described disadvantages.

It is accordingly an objective of the present invention to provide a backlash reducing structure for a recliner adjuster which has a simple configuration and with which the stability and seating comfort are improved by reducing the backlash.

In accomplishing the above and other objectives, the backlash reducing structure according to the present invention includes a worm gear attached rotatably to a seat cushion, a sector gear fixed to a seat back and held in engagement with the worm gear, and a pressing member for pressing the sector gear to the worm gear to reduce backlash therebetween. This construction improves the stability and seating comfort of a recliner.

The backlash reducing structure further includes a bracket attached to the seat cushion and having a tapered groove formed therein, wherein the pressing member includes a roller attached rockingly to the sector gear and inserted loosely in the tapered groove. The roller is biased along an edge of the tapered groove to press the sector gear to the worm gear. With this simple construction, the backlash is positively reduced.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

This application is based on application No. 11-160886 filed Jun. 8, 1999 in Japan, the content of which is incorporated hereinto by reference.

Figure 1:
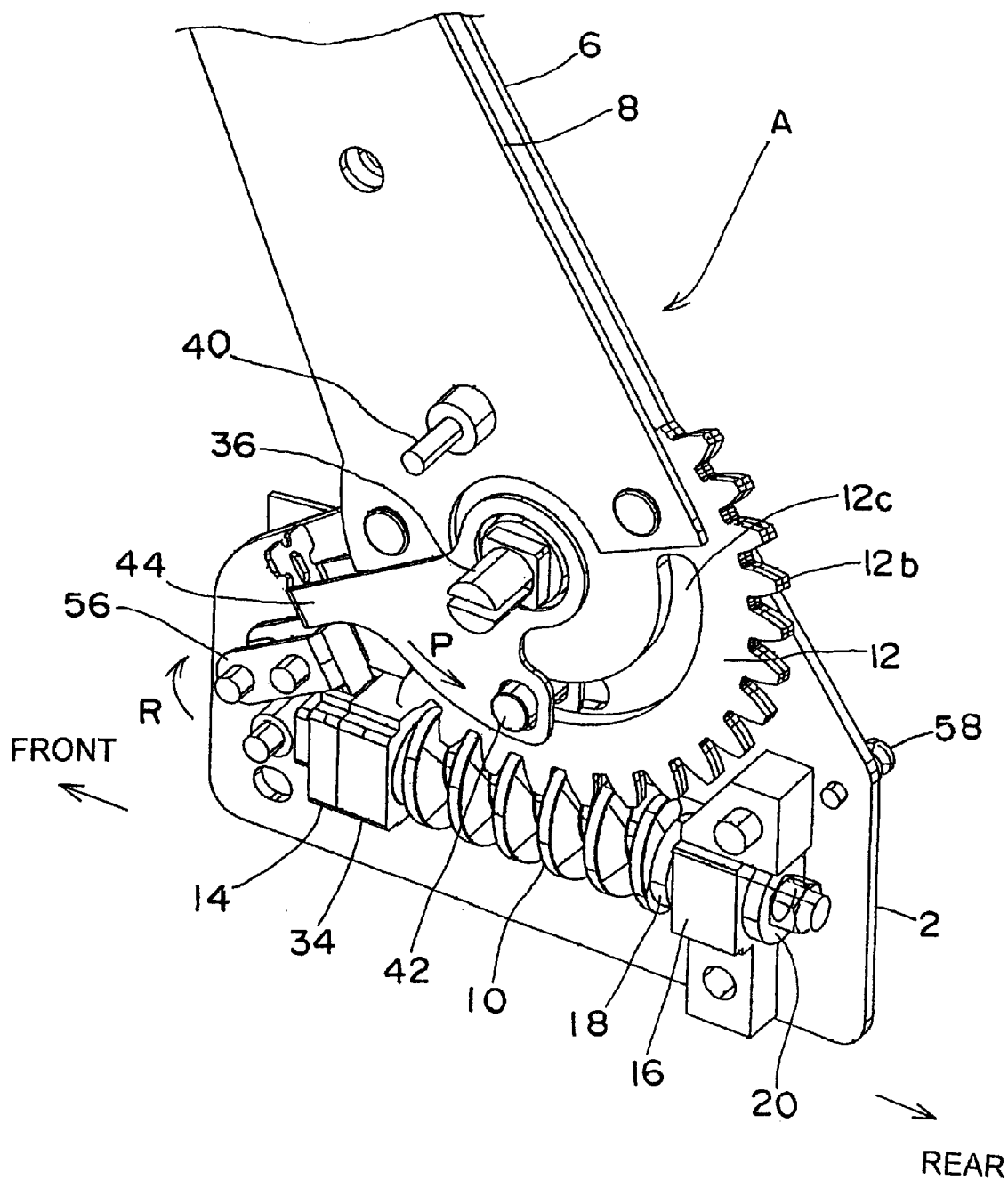
FIG. 1 is a perspective view of a recliner adjuster having a backlash reducing structure according to the present invention.
Figure 2:
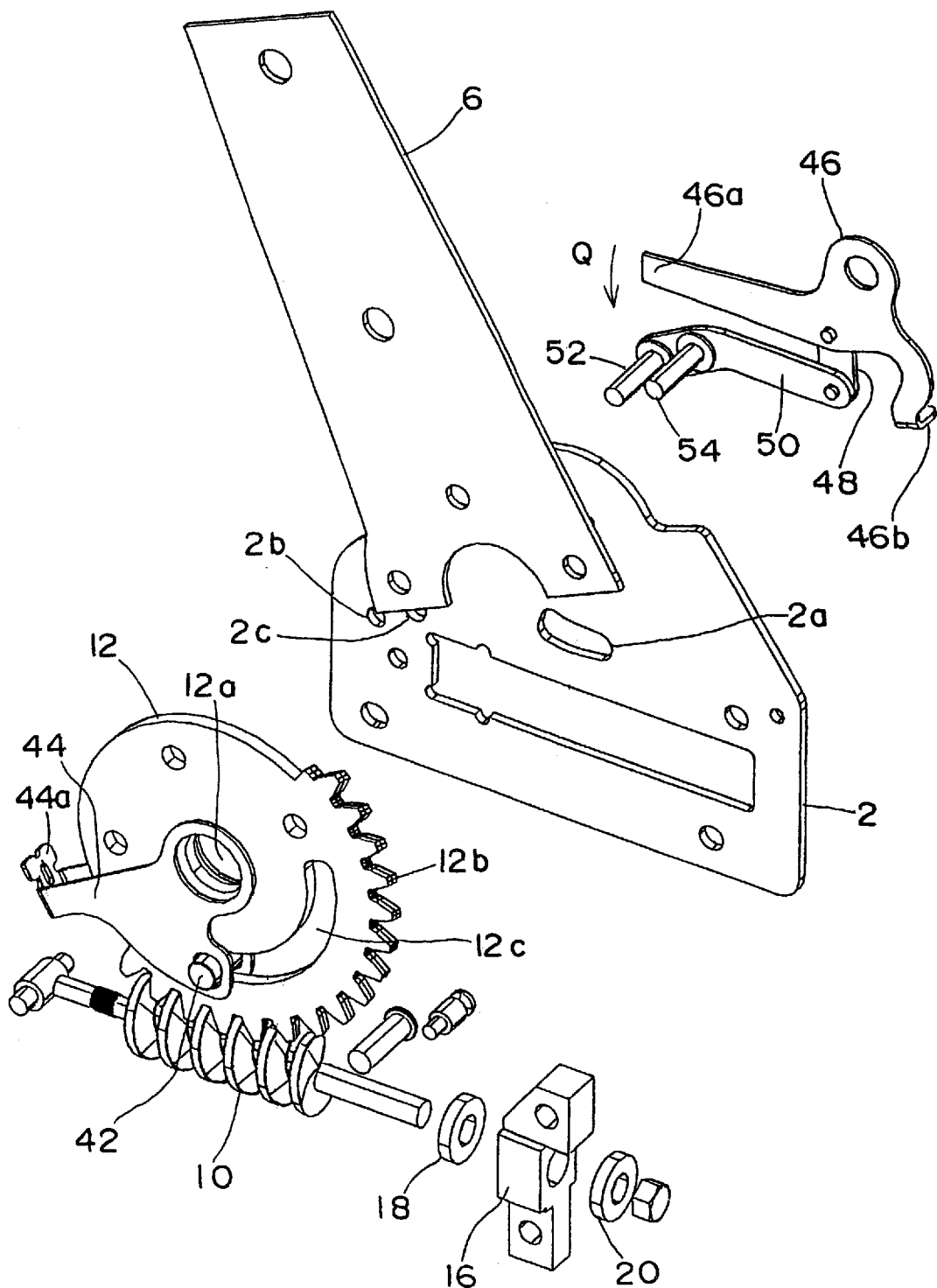
FIG. 2 is a partial exploded perspective view of the recliner adjuster of FIG. 1.
Figure 3:
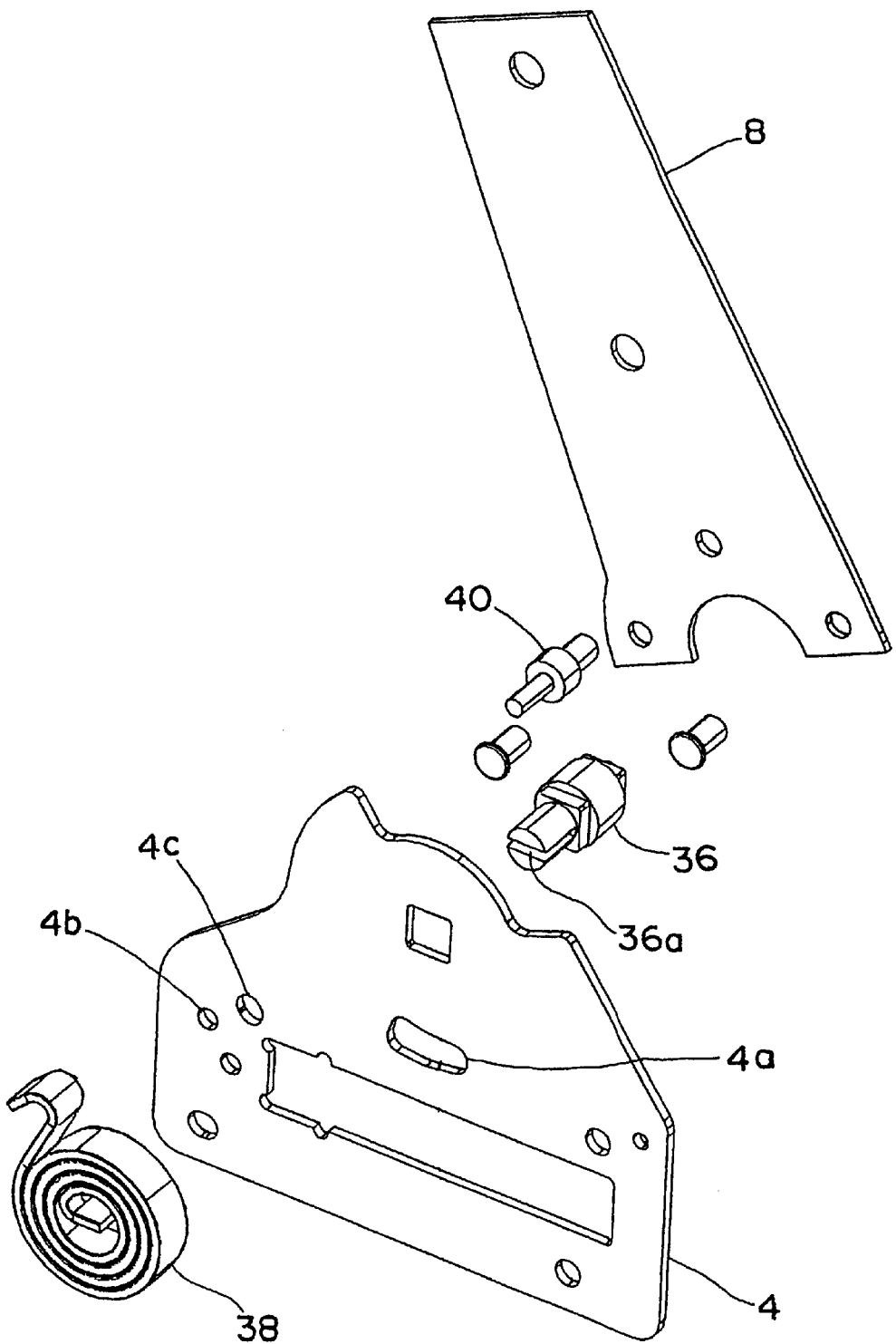
FIG. 3 is another partial exploded perspective view of the recliner adjuster of FIG. 1.

There is shown in FIGS. 1 to 3 a recliner adjuster A having a backlash reducing structure according to the present invention. The recliner adjuster A is attached to an automotive seat, a recliner or the like, and includes a pair of first brackets 2, 4 attached to a seat cushion (not shown) and a pair of second brackets 6, 8 attached to a seat back (not shown).

A worm gear 10 is attached rotatably to the first brackets 2, 4, while a sector gear 12 is fixed to the second brackets 6, 8. The worm gear 10 and sector gear 12 have a larger lead angle than the friction angle and are held in engagement with each other.

The front end of the worm gear 10 is supported rotatably by a front bearing 14, and the rear end of the worm gear 10 is supported rotatably by a rear bearing 16. Two thrust bearings 18, 20 disposed in front of and behind the rear bearing 16 are fixed to a rear end portion of the worm gear 10.

Figure 4:
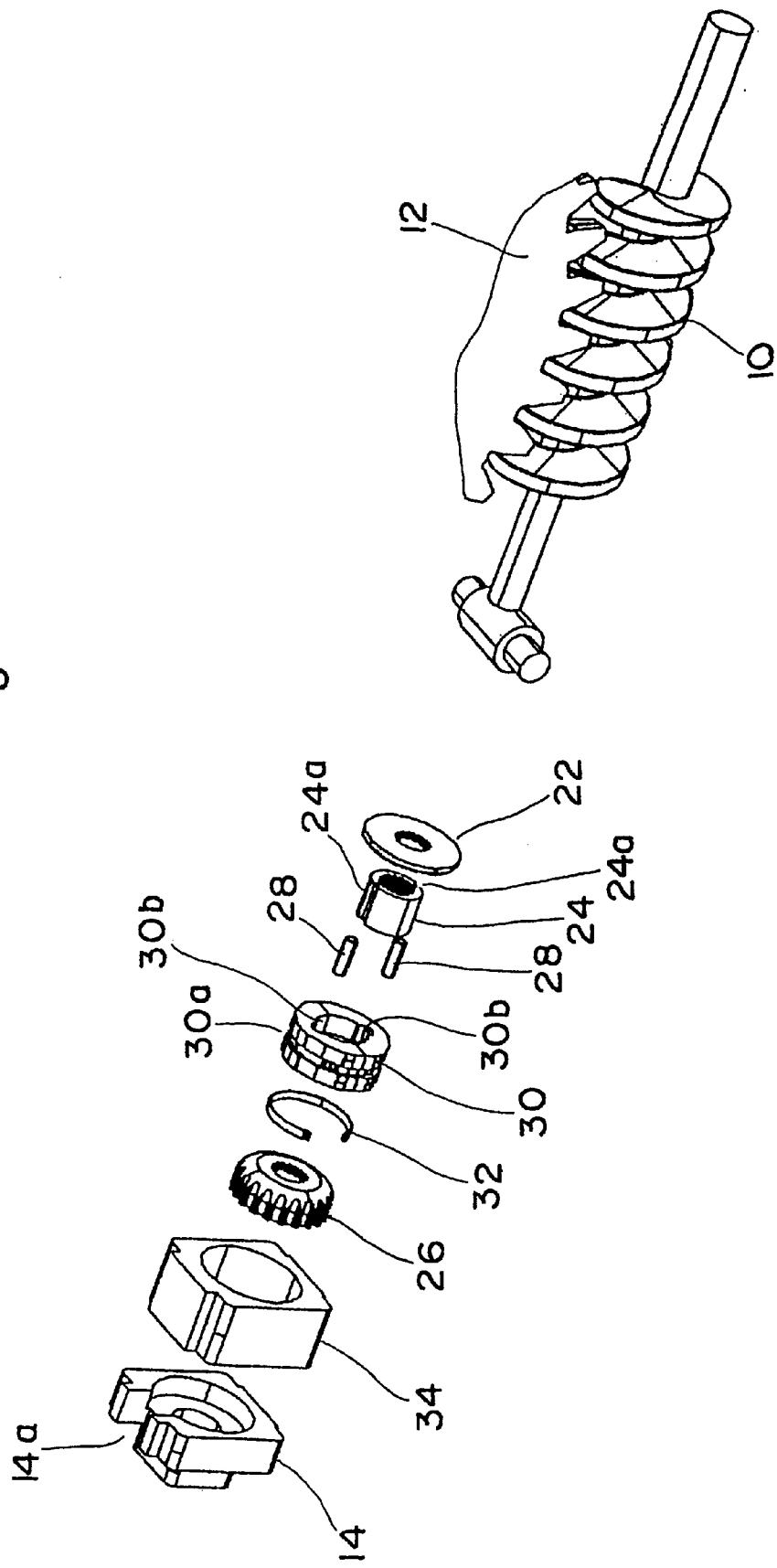
FIG. 4 is an exploded perspective view of an emergency lock mechanism provided in the recliner adjuster of FIG. 1.

An emergency lock mechanism mounted on the front end of the worm gear is explained hereinafter with reference to FIG. 4.

A washer 22, cam 24, and brake ring 26 are attached in this sequence to the front end of the worm gear 10, and a split brake shoe 30 is provided by way of two rollers 28, 28 around the cam 24. A circumferential groove 30a is formed in a center portion in the axial direction on the outer surface of the brake shoe 30, and the split brake shoe 30 is biased inward in the radial direction by an arc-shaped spring 32 fitted into the groove 30a. The brake ring 26 and brake shoe 30 are housed respectively in the front bearing 14 and brake drum 34 supported by the first brackets 2, 4.

Returning to FIG. 1 to FIG. 3, a further description of the recliner adjuster A is given below.

A circular hole 12a is formed in the sector gear 12 at the center thereof, and a center shaft 36 loosely inserted in the circular hole 12a is attached to the first brackets 2, 4. The sector gear 12 is attached rotatably about the center shaft 36. A slit 36a is formed in the center shaft 36 on one side thereof. Because one end of a balance spring 38, of which the other end is engaged with the slit 36a, is engaged by an engaging shaft 40 attached to the second brackets 6, 8, the seat back is continually biased forward due to the elastic force of the balance spring 38.

Furthermore, a guide groove 12c is formed between the circular hole 12a and teeth 12b of the sector gear 12 so as to extend in the circumferential direction, and a roller 42 is loosely inserted in the guide groove 12c. The roller 42 is further inserted in tapered grooves 2a, 4a defined in the first brackets 2, 4, and opposite ends thereof are held by a roller holder 44 attached rockingly to the center shaft 36. The roller holder 44 is continually biased in the direction of an arrow P by the elastic force of a coil spring 45 (FIG. 5), opposite ends of which are engaged with the first bracket 2 and the tip end 44a of the roller holder 44, respectively.

An operation lever 46 is disposed laterally outwardly of the first bracket 2, and an operation knob (not shown), which a seat occupant holds, is attached to a front end 46a of the operation lever 46. A second link 50 is connected to the operation lever 46 by way of a first link 48, and two shafts 52, 54 are secured to a front end portion of the second link 50. The shafts 52, 54 are loosely inserted in small-diameter holes 2b, 4b and large-diameter holes 2c, 4c formed in the first brackets 2, 4, and a lock member 56 is mounted on the shafts 52, 54. An uneven surface is formed at the tip end of the lock member 56, and this uneven surface opposes a serration formed in the circumference of the brake ring 26 by way of an upper opening 14a of the front bearing 14.

Because the operation lever 46 is biased in the direction of an arrow Q by a coil spring (not shown) engaged by a pin 58 secured to the first bracket 2 and the rear end 46b thereof, the lock member 56 is continually biased, about the shaft 52, in the direction of an arrow R in which the tip end thereof abuts the serration of the brake ring 26.

The recliner adjuster A of the above-mentioned configuration operates as follows.

In the normal state, in which the operation lever 46 is not being operated, the operation lever 46 is biased in the direction of the arrow Q by the coil spring engaged with the rear end 46b of the operation lever 46, and the lock member 56, which is connected to the shaft 52 loosely inserted in the small-diameter holes 2b, 4b and the shaft 54 loosely inserted in the large-diameter holes 2c, 4c, is continually subjected to the urging force in the direction of the arrow R. Accordingly, the tip end of the lock member 56 engages with (abuts) the brake ring 26 by way of the upper opening 14a of the front bearing 14 and prevents rotation of the brake ring 26. Because the brake ring 26 is integrally supported by the front end portion of the worm gear 10 whereby rotation of the worm gear 10 is prevented, the inclination of the seat back with respect to the seat cushion is maintained.

If the inclination of the seat back is required to be altered, the engagement between the lock member 56 and brake ring 26 is released when the operation lever 46 is operated to rotate the lock member 56 in the reverse direction of the arrow R, making it possible to freely rotate the worm gear 10.

Because the lead angle of the sector gear 12 and worm gear 10 held in engagement with each other is set larger than the friction angle, and the worm gear 10 rotates when the rotational force about the center shaft 36 is applied to the sector gear 12, the seat back is tilted forward by the elastic force of the balance spring 38, or it is tilted backward by a seat occupant applying a load in the backward direction to the seat back. When the hand is released from the operation lever 46 at the desired position, the tip end of the lock member 56 re-engages with the outer circumferential surface of the brake ring 26 whereby rotation of the worm gear 10 is prevented, thus maintaining the inclination of the seat back at its current angle.

Moreover, in an unlocked state in which the operation lever 46 is operated to release the engagement of the brake ring 26 with the lock member 56, even if a large deceleration is applied to the vehicle body due to, for example, collision of the car, sudden forward or backward tilt of the seat back is prevented by the emergency lock mechanism.

That is, in the unlocked state, when the worm gear 10 is rotated at a velocity or acceleration above a predetermined value, the cam 24 and brake shoe 30 are also rotated together. At this time, the brake shoe 30 spreads outward in the radial direction against the elastic force of the arc-shaped spring 32 and abuts the inner circumferential surface of the brake drum 34, whereby the rotation thereof is stopped. As a result, because the rotation of the worm gear 10 is also stopped by way of the rollers 28, 28 and the cam 24, sudden forward or backward tilt of the seat back is prevented and the seat back is held in its position.

More specifically, when the worm gear 10 is rotated at a rotational acceleration above a predetermined value, a resistance to rotation is generated in the brake shoe 30 by the inertial mass thereof. For this reason, the relative positions of the cam 24 and brake shoe 30 are altered, and the rollers 28, 28 are rotated slightly along the inclined surfaces of recesses 24a, 30b provided in both the brake shoe 30 and cam 24. As a result, the brake shoe 30 spreads out whereby its outer circumferential surface abuts the inner circumferential surface of the brake drum 34 to lock the worm gear 10.

When the worm gear 10 is rotated at a rotational speed above a predetermined value, the brake shoe 30 is caused to spread out by the centrifugal force thereof whereby the outer circumferential surface thereof abuts the inner circumferential surface of the brake drum 34 to lock the worm gear 10.

The setting of the rotational speed and rotational acceleration of the worm gear 10 is carried out on the basis of the mass of the brake shoe 30 and the elastic force of the arc-shaped spring 32 which biases the brake shoe 30 inward.

Figure 5:
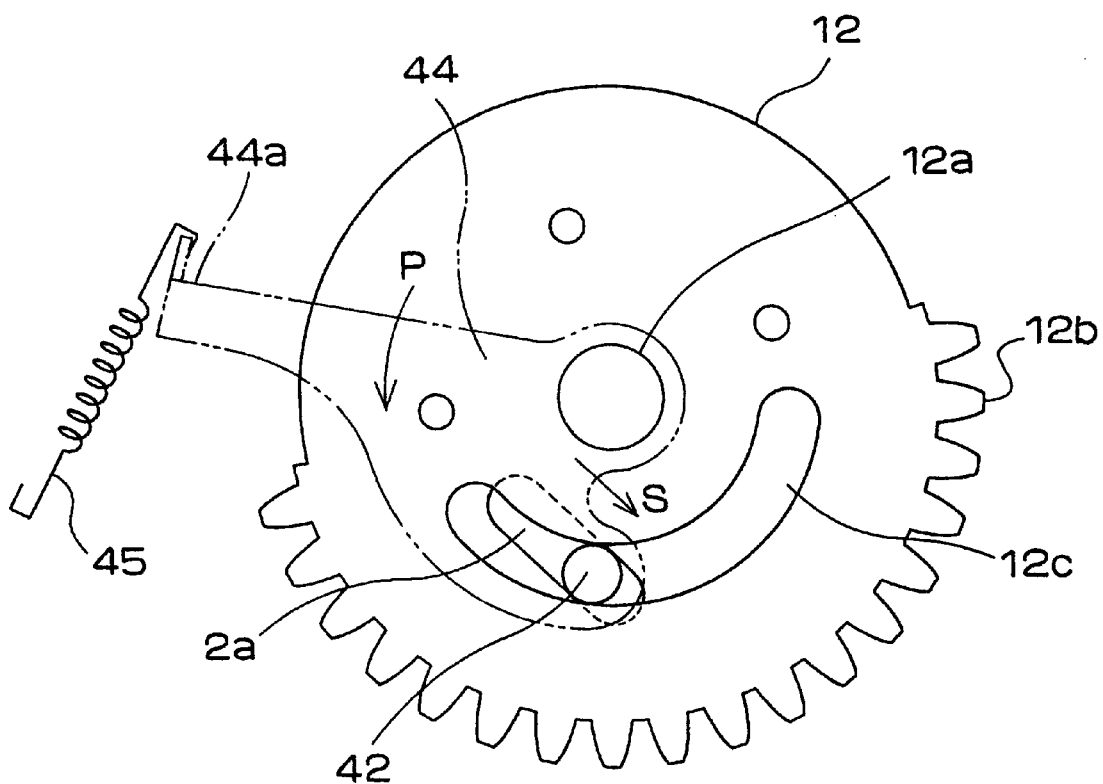
FIG. 5 is a schematic view explanatory of the operation of the backlash reducing structure according to the present invention.

The backlash reducing structure according to the present invention is discussed hereinafter with reference to FIG. 5.

Because the roller holder 44 is biased in the direction of the arrow P by the elastic force of a coil spring engaged with the tip end 44a thereof, the roller 42 supported by the roller holder 44 is continually biased in the direction of the arrow S. Because the tapered grooves 2a, 4a formed in the first brackets 2, 4 and the guide groove 12c formed in the circumferential direction of the sector gear 12 intersect at a predetermined angle, the roller 42 is, by the elastic force of the coil spring 45, thrust into a space between the roller holder 44 and sector gear 12, like a wedge, while abutting the upper edges of the tapered grooves 2a, 4a, thereby biasing the sector gear 12 downward toward the worm gear 10.

Accordingly, even if the precision of the members constituting the recliner adjuster A is somewhat poor, teeth 12b of the sector gear 12 are pressed toward grooves of the worm gear 10 whereby the backlash, which constitutes the play between the teeth surfaces of the sector gear 12 and worm gear 10, can be reduced.

In the above-mentioned backlash reducing structure, the roller 42 acts as a pressing member for the sector gear 12.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A backlash reducing structure for a recliner adjuster that is attached to a recliner having a seat cushion and a seat back, said backlash reducing structure comprising:
   - a worm gear attached rotatably to the seat cushion;
   - a sector gear fixed to the seat back and held in engagement with said worm gear;
   - a pressing member for pressing said sector gear to said worm gear to reduce backlash therebetween; and
   - a bracket attached to the seat cushion and having a tapered groove formed therein, wherein said pressing member comprises a roller attached rockingly to said sector gear and inserted loosely in the tapered groove, said roller being biased along an edge of the tapered groove to press said sector gear to said worm gear.

2. A backlash reducing structure for a recliner adjuster that is attached to a recliner having a seat cushion bracket and a seat back bracket, said backlash reducing structure comprising:
   - a worm gear attached rotatably to the seat cushion bracket;
   - a sector gear fixed to the seat back bracket and held in engagement with said worm gear;
   - a pressing member for pressing said sector gear to said worm gear to reduce backlash therebetween; and
   - wherein said seat cushion bracket has a tapered groove formed therein, said pressing member comprises a roller attached rockingly to said sector gear and inserted loosely in the tapered groove, and said roller is biased along an edge of the tapered groove to press said sector gear to said worm gear.

* * * * *